(12) United States Patent  
Suzuki et al.

(10) Patent No.: US 11,990,846 B2  
(45) Date of Patent: May 21, 2024

(54) POWER CONVERSION APPARATUS, MOTOR DRIVE APPARATUS, BLOWER, COMPRESSOR, AND AIR CONDITIONER

(71) Applicant: Mitsubishi Electric Corporation, Tokyo (JP)

(72) Inventors: Motoya Suzuki, Tokyo (JP); Satoru Ichiki, Tokyo (JP); Keisuke Uemura, Tokyo (JP); Koichi Arisawa, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 129 days.

(21) Appl. No.: 17/641,137

(22) PCT Filed: Nov. 14, 2019

(86) PCT No.: PCT/JP2019/044782  
§ 371 (c)(1),  
(2) Date: Mar. 8, 2022

(87) PCT Pub. No.: WO2021/095216  
PCT Pub. Date: May 20, 2021

(65) Prior Publication Data  
US 2022/0345050 A1 Oct. 27, 2022

(51) Int. Cl.  
*H02P 27/06* (2006.01)  
*F24F 7/007* (2006.01)  
(Continued)

(52) U.S. Cl.  
CPC ............ *H02M 7/217* (2013.01); *F24F 7/007* (2013.01); *H02M 1/0009* (2021.05); *H02P 27/06* (2013.01)

(58) Field of Classification Search  
CPC ...... H02M 7/217; H02M 1/0009; H02P 27/06  
See application file for complete search history.

(56) References Cited

U.S. PATENT DOCUMENTS 9,847,735 B2 12/2017 Shimomugi et al.  
9,991,788 B2 6/2018 Oe et al.  
(Continued)

FOREIGN PATENT DOCUMENTS

JP 2010-206941 A 9/2010  
JP 2017-118767 A 6/2017  
(Continued)

OTHER PUBLICATIONS

Office Action dated Aug. 23, 2022 issued in corresponding JP Patent Application No. 2021-555733 (and English machine translation).  
(Continued)

*Primary Examiner* — Rina I Duda  
(74) *Attorney, Agent, or Firm* — POSZ LAW GROUP, PLC

(57) ABSTRACT

A power conversion apparatus includes a converter circuit converting AC voltage output from an AC power supply into DC voltage. The converter circuit includes unit converters. The power conversion apparatus includes a low current-oriented controller the unit converters to cause current corresponding to a single phase to flow through a current detector, and a high current-oriented controller controlling operation of the unit converters based on a result of comparison between a duty command and a carrier signal, where the duty command is generated based on detection values detected by the current detector and a voltage detector. When the detection value detected by the current detector is less than or equal to a first threshold, the low current-oriented controller is activated, and when the detection value  
(Continued)

detected by the current detector is greater than the first threshold, the high current-oriented controller is activated.

14 Claims, 11 Drawing Sheets

(51) Int. Cl.
*H02M 1/00* (2006.01)
*H02M 7/217* (2006.01)

(56) References Cited

U.S. PATENT DOCUMENTS

| | | | |
|---|---|---|---|
| 2011/0280049 A1* | 11/2011 | Mori | H02M 1/4216 |
| | | | 363/25 |
| 2016/0006345 A1* | 1/2016 | Yoshinaga | H02M 1/4208 |
| | | | 318/400.26 |
| 2016/0087547 A1* | 3/2016 | Yamada | H02M 1/4225 |
| | | | 363/124 |
| 2016/0248365 A1* | 8/2016 | Ishizeki | H02M 1/4225 |
| 2018/0287490 A1* | 10/2018 | Yuasa | H02M 1/08 |

FOREIGN PATENT DOCUMENTS

| | | |
|---|---|---|
| JP | 2017-208976 A | 11/2017 |
| WO | 2013157303 A1 | 10/2013 |

OTHER PUBLICATIONS

International Search Report dated Feb. 4, 2020, issued in corresponding International Patent Application No. PCT/JP2019/044782.

* cited by examiner

POWER CONVERSION APPARATUS, MOTOR DRIVE APPARATUS, BLOWER, COMPRESSOR, AND AIR CONDITIONER

CROSS REFERENCE TO RELATED APPLICATION

This application is a U.S. National Stage Application of International Application No. PCT/JP2019/044782, filed on Nov. 14, 2019, the contents of which are incorporated herein by reference.

FIELD

The present invention relates to a power conversion apparatus that converts an alternating-current (AC) voltage output from an AC power supply into a direct-current (DC) voltage, to a motor drive apparatus including the power conversion apparatus, to a blower and to a compressor including the motor drive apparatus, and to an air conditioner including the blower or the compressor.

BACKGROUND

Patent Literature 1 below describes an interleaved converter that generates a desired output voltage by driving n-phase switching output stages with a phase difference of 360 degrees (°)/n, which interleaved converter provides balance control of reactor currents flowing through reactors of respective phases on the basis of the return current signal based on the detection current detected for each reactor, and on the return voltage signal.

CITATION LIST

Patent Literature

Patent Literature 1: Japanese Patent Application Laid-open No. 2017-208976

SUMMARY

Technical Problem

However, the technology of Patent Literature 1 does not take into account a piece-to-piece variation among reactors for respective phases, i.e., a difference between the inductance values of reactors. A piece-to-piece variation among reactors can be identified at the time of product shipment or on similar occasions. On the other hand, a piece-to-piece variation among reactors may occur irregularly during use of the product due to aging degradation and/or the like. When a piece-to-piece variation among reactors has occurred, the technology of Patent Literature 1 may fail to sufficiently equalize the reactor currents of the respective phases.

The present invention has been made in view of the foregoing, and it is an object of the present invention to provide a power conversion apparatus capable of equalizing reactor currents even when a piece-to-piece variation has occurred among reactors for respective phases.

Solution to Problem

To solve the problem and achieve the object described above, a power conversion apparatus according to the present invention includes a converter circuit comprising unit converters corresponding to a respective plurality of phases and converting an alternating current voltage output from an alternating current power supply into a direct current voltage, the unit converters each comprising a reactor and at least one switching element. The power conversion apparatus also includes a current detector detecting a sum of currents flowing through the reactors. The power conversion apparatus also includes a voltage detector detecting an output voltage of the converter circuit. The power conversion apparatus also includes a first controller causing the unit converters to operate to cause a current corresponding to a single phase to flow through the current detector. The power conversion apparatus also includes a second controller controlling an operation of the unit converters on a basis of a result of comparison between a duty command and a carrier signal, the duty command being generated on a basis of detection values detected by the current detector and by the voltage detector. When the detection value detected by the current detector is less than or equal to a first threshold, the first controller is activated. When the detection value detected by the current detector is greater than the first threshold, the second controller is activated.

Advantageous Effects of Invention

A power conversion apparatus according to the present invention provides an advantage in being capable of equalizing reactor currents even when a piece-to-piece variation has occurred among reactors for respective phases.

DESCRIPTION OF EMBODIMENTS

A power conversion apparatus, a motor drive apparatus, a blower, a compressor, and an air conditioner according to embodiments of the present invention will be described below with reference to the accompanying drawings. Note that the following embodiments are not intended to limit the scope of the present invention. Note also that the following description refers to an electrical connection simply as "connection".

First Embodiment

Figure 1:
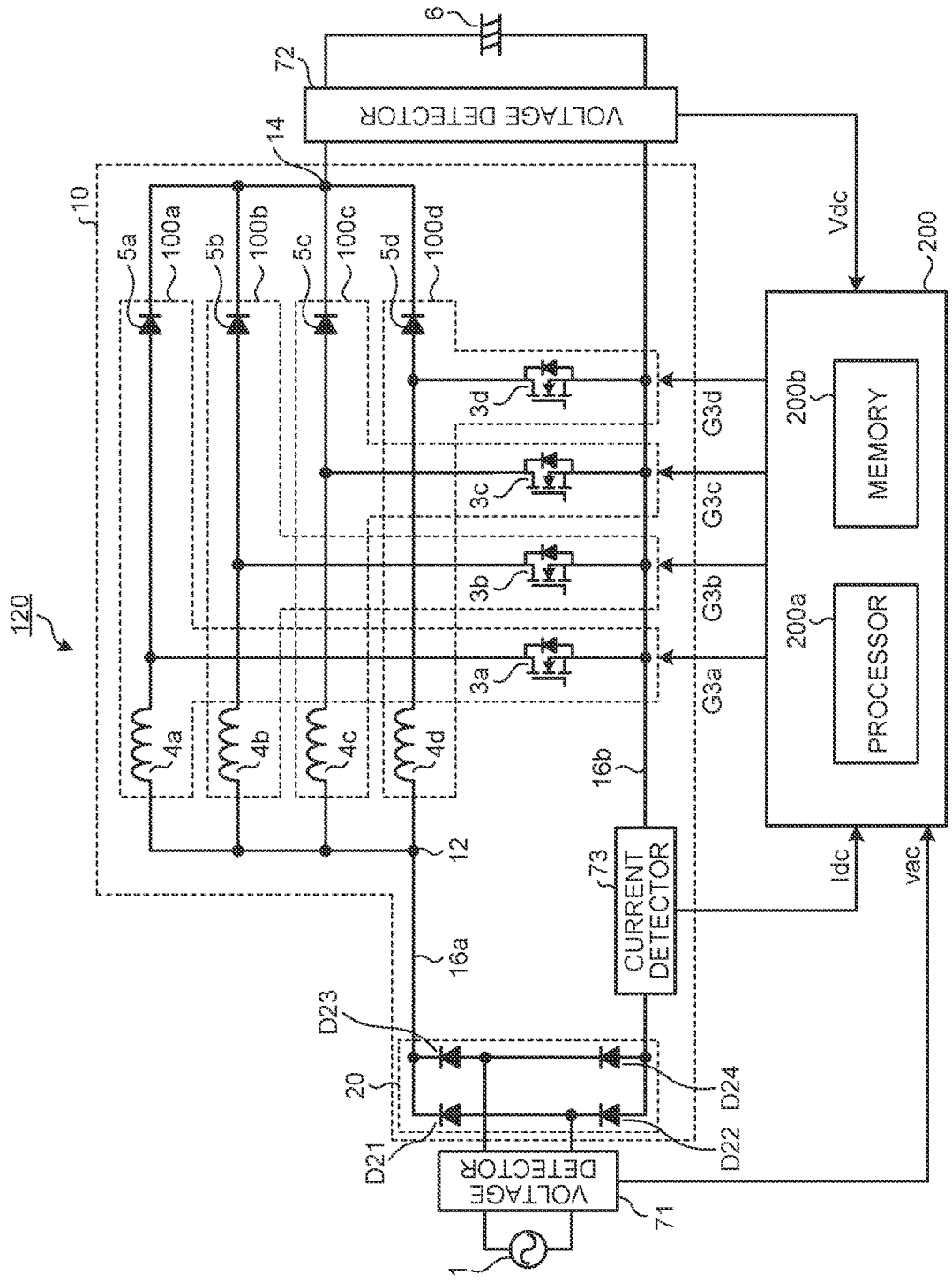
FIG. 1 is a diagram illustrating a configuration of a power conversion apparatus according to a first embodiment.

FIG. 1 is a diagram illustrating a configuration of a power conversion apparatus 120 according to a first embodiment. The power conversion apparatus 120 according to the first embodiment includes a converter circuit 10, a smoothing capacitor 6, voltage detectors 71 and 72, a current detector 73, and a control device 200.

The converter circuit 10 converts an AC voltage output from an AC power supply 1 into a DC voltage. The smoothing capacitor 6 smooths and holds the DC voltage obtained by the conversion performed by the converter circuit 10.

The converter circuit 10 includes unit converters 100a, 100b, 100c, and 100d (hereinafter described as "100a to 100d" as appropriate; similar notation is also used for other reference characters) and a rectification circuit 20.

In the converter circuit 10, the unit converters 100a to 100d are connected in parallel with one another. The unit converters 100a to 100d operate sequentially with a predetermined period. This period is called "interleaving period".

The rectification circuit 20 includes four diodes D21, D22, D23, and D24 connected in a bridge configuration. The rectification circuit 20 rectifies the AC voltage output from the AC power supply 1, and applies the voltage that has been rectified to the unit converters 100a to 100d.

The unit converter 100a includes a reactor 4a, a backflow-preventing diode 5a, and a switching element 3a. The unit converter 100b includes a reactor 4b, a backflow-preventing diode 5b, and a switching element 3b. The unit converter 100c includes a reactor 4c, a backflow-preventing diode 5c, and a switching element 3c. The unit converter 100d includes a reactor 4d, a backflow-preventing diode 5d, and a switching element 3d.

In the converter circuit 10, a combination of one reactor and one switching element is defined as "phase", and is counted as "one phase".

FIG. 1 illustrates an example of four phases having a configuration for four-phase interleaving. The phases are identified by suffixes of a, b, c, and d. Operations of the respective phases may hereinafter be indicated by "phase a", "phase b", "phase c", and "phase d". Note that the application of the present invention is not limited to four-phase interleaving, but may also be two-, three-, or five-or-more-phase interleaving. That is, the present invention is directed to an interleaved power conversion apparatus that includes unit converters for respective multiple phases.

The converter circuit 10 includes a junction point 12, at which ends on one side of the respective reactors 4a to 4d are connected to one another. The junction point 12 and one end of the rectification circuit 20 are connected to each other via an electric wire 16a. The converter circuit 10 also includes a junction point 14, at which the cathodes of respective backflow-preventing diodes 5a to 5d are connected to one another. The junction point 14 is connected to the positive electrode-side terminal of the smoothing capacitor 6.

In addition, in the unit converter 100a, the reactor 4a has another end connected to the anode of the backflow-preventing diode 5a. The junction point of the reactor 4a and the backflow-preventing diode 5a is connected to one end of the switching element 3a. The unit converters 100b to 100d are configured similarly to the unit converter 100a. In addition, in the unit converters 100a to 100d, the switching elements 3a, 3b, 3c, and 3d have another ends also connected to one another. The other ends of the respective switching elements 3a, 3b, 3c, and 3d and another end of the rectification circuit 20 are connected to each other via an electric wire 16b.

An example of each of the switching elements 3a to 3d is a metal oxide semiconductor field-effect transistor (MOSFET). An insulated gate bipolar transistor (IGBT) may be used instead of a MOSFET.

The switching elements 3a to 3d each include a diode connected in antiparallel between the drain and the source. Connection in antiparallel means that the drain of a MOSFET is connected with the cathode of the diode, and the source of the MOSFET is connected with the anode of the diode. Note that the diode may be a parasitic diode inside the MOSFET itself. A parasitic diode is also called a body diode.

Note that the switching elements 3a to 3d are not limited to a MOSFET formed of silicon, but may also be a MOSFET formed of a wide bandgap semiconductor such as silicon carbide, gallium nitride, gallium oxide, or diamond.

A wide bandgap semiconductor generally has a higher voltage resistance and a higher heat resistance than a silicon semiconductor. Thus, use of a wide bandgap semiconductor for the switching elements 3a to 3d increases voltage resistance and allowable current density of each of the switching elements, thereby allowing size reduction of the semiconductor module incorporating these switching elements.

The current detector 73 is disposed on the electric wire 16b. The current detector 73 detects a total current Idc, which is the sum of the reactor currents flowing through the respective reactors 4a to 4d. Note that FIG. 1 illustrates a configuration in which the current detector 73 is disposed on the electric wire 16b by way of example, but the configuration is not limited thereto. The current detector 73 may be disposed on the electric wire 16a.

The voltage detector 71 detects an AC voltage vac, which is the output voltage of the AC power supply 1. The voltage detector 72 detects a capacitor voltage Vdc, which is the voltage across the smoothing capacitor 6. The capacitor voltage Vdc is also the output voltage of the converter circuit 10.

The control device 200 includes a processor 200a and a memory 200b. The control device 200 receives a detection value of the total current Idc detected by the current detector 73. The control device 200 receives a detection value of the AC voltage vac detected by the voltage detector 71. The control device 200 receives a detection value of the capacitor voltage Vdc detected by the voltage detector 72.

The control device 200 generates gate signals G3a, G3b, G3c, and G3d on the basis of the total current Idc, the AC voltage vac, and the capacitor voltage Vdc.

The unit converters 100a to 100d each include a gate drive circuit not illustrated. The gate drive circuit of the unit converter 100a generates a drive pulse using the gate signal G3a output from the control device 200, and applies the drive pulse generated, to the gate of the switching element 3a to drive the switching element 3a.

The gate drive circuit of the unit converter 100b generates a drive pulse using the gate signal G3b output from the control device 200, and applies the drive pulse generated, to the gate of the switching element 3b to drive the switching element 3b.

The gate drive circuit of the unit converter 100c generates a drive pulse using the gate signal G3c output from the control device 200, and applies the drive pulse generated, to the gate of the switching element 3c to drive the switching element 3c.

The gate drive circuit of the unit converter 100d generates a drive pulse using the gate signal G3d output from the control device 200, and applies the drive pulse generated, to the gate of the switching element 3d to drive the switching element 3d.

A specific operation of the control device 200 will be described later. Note that the detection value of the AC voltage vac detected by the voltage detector 71, among the detection values input to the control device 200, is used for reduction of distortion of a current flowing through the converter circuit 10. Therefore, the fundamental operation of the converter circuit 10 can be controlled without including the voltage detector 71.

In the control device 200, the processor 200a is computing means such as a computing unit, a microprocessor, a microcomputer, a central processing unit (CPU), or a digital signal processor (DSP). The memory 200b is a non-volatile or volatile semiconductor memory such as a random access memory (RAM), a read-only memory (ROM), a flash memory, an erasable programmable ROM (EPROM), or an electrically EPROM (EEPROM) (registered trademark).

The memory 200b stores programs for performing the functionality of the control device 200 described above and functionality of the control device 200 described later. The processor 200a provides and receives needed information via an interface including an analog-to-digital converter and a digital-to-analog converter (both not illustrated), and the processor 200a executes a program stored in the memory 200b to perform necessary processing. A result of computation by the processor 200a is stored in the memory 200b.

When one of the switching elements 3a to 3d is controlled and performs a switching operation, power supplied from the AC power supply 1 is stored in the corresponding reactor. The control device 200 performs control of causing the switching elements 3a to 3d to perform switching operation at a predetermined duty so that the voltage output from the converter circuit 10 is a desired voltage.

A difference that may occur between the reactor currents of a pair of phases during operation of the power conversion apparatus 120 according to the first embodiment will next be described.

Figure 2:
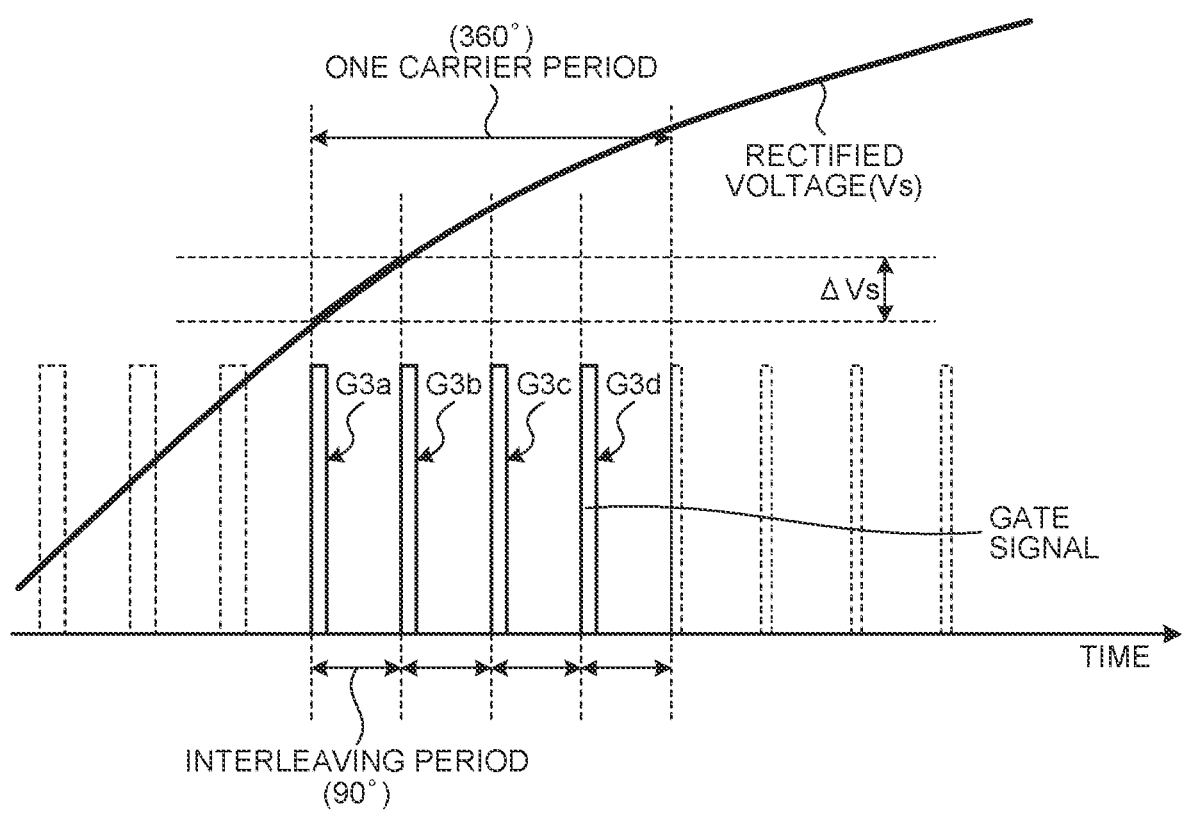
FIG. 2 is a waveform chart for use in describing an operation of the power conversion apparatus according to the first embodiment.

FIG. 2 is a waveform chart for use in describing an operation of the power conversion apparatus 120 according to the first embodiment. The horizontal axis represents time.

In FIG. 2, the waveform represented by the bold line represents a rectified voltage Vs. The rectified voltage Vs is the output voltage from the rectification circuit 20, and is also the voltage applied to the unit converters 100a to 100d. The four pulses represented by the solid lines represent the gate signals in a carrier period of interest. Specifically, the four pulses represent, from left to right in the positive direction of the time axis, the gate signal G3a, the gate signal G3b, the gate signal G3c, and the gate signal G3d.

The gate signals G3a to G3d are pulse width modulation (PWM) signals. As compared to these gate signals, the gate signals represented by broken lines in one carrier period before the carrier period of interest each have a pulse width greater than the pulse width of each of the gate signals in the carrier period of interest. In addition, the gate signals represented by broken lines one carrier period after the carrier period of interest each have a pulse width less than the pulse width of each of the gate signals in the carrier period of interest. Moreover, the interval between each pair of adjacent gate signals of the gate signals G3a to G3d corresponds to the interleaving period.

One carrier period is the period of carrier signals. The interleaving period in a power conversion apparatus that performs four-phase interleaving is 90° (=360°/4) when the phase range during one carrier period is 360°. The carrier signals will be described later.

A change in the reactor current flowing through the reactor upon turning on of the switching element in each of the unit converters will next be described. Note that a change in a reactor current is called "current ripple", and the current ripples in the respective unit converters 100a to 100d are respectively denoted by ΔIa, ΔIb, ΔIc, and ΔId. These current ripples ΔIa, ΔIb, ΔIc, and ΔId can be expressed by Equations (1) to (4) below.

$$\Delta Ia = (Vac\_a / La) \cdot Ton\_a \tag{1}$$

$$\Delta Ib = (Vac\_b / Lb) \cdot Ton\_b \tag{2}$$

$$\Delta Ic = (Vac\_c / Lc) \cdot Ton\_c \tag{3}$$

$$\Delta Id = (Vac\_d / Ld) \cdot Ton\_d \tag{4}$$

In Equations (1) to (4) above, La, Lb, Lc, and Ld represent the inductance values of the respective reactors 4a, 4b, 4c, and 4d. In addition, Ton_a, Ton_b, Ton_c, and Ton_d represent the On times upon turning on of the switching elements 3a, 3b, 3c, and 3d. Moreover, Vac_a, Vac_b, Vac_c, and Vac_d represent the instantaneous values of the reactor voltages appearing across the reactors 4a, 4b, 4c, and 4d when the switching elements 3a, 3b, 3c, and 3d are turned on.

Assuming here that the voltage is applied to each of the unit converters for a fixed period of time and that the reactors of the respective unit converters 100a to 100d vary from piece to piece only to a sufficiently low degree, the instantaneous values Vac_a, Vac_b, Vac_c, and Vac_d of the reactor voltages are almost the same. That is, a relationship of Vac_a=Vac_b=Vac_c=Vac_d can be reasonably considered to hold during one carrier period. In this case, use of the same duty factor for the PWM signals for the respective switching elements in one carrier period results in the same current ripple in one carrier period. This then results in the same average current value for the reactors in one carrier period.

On the contrary, the AC power supply 1 of the power conversion apparatus 120 according to the first embodiment is a voltage source having a power supply period; therefore, the voltage applied to each of the unit converters varies over time. FIG. 2 illustrates a situation in which the voltage applied to the unit converter 100b at a time when the switching element 3b of the unit converter 100b is turned on is higher by an amount of ΔVs than the voltage applied to the unit converter 100a at a time when the switching element 3a of the unit converter 100a is turned on.

Thus, when a voltage source having a power supply period is used, driving the switching elements with gate pulses having the same duty value will cause the current ripples of the respective reactor currents to have values different from one another. A difference in the values of the current ripples in one carrier period in turn causes a difference among the average values of the respective reactor currents during one power supply period.

The foregoing description has been provided with respect to a difference between average values of respective reactor currents caused by a difference in the voltage applied to the unit converters in one carrier period. A similar situation also occurs when a piece-to-piece variation occurs among reactors for respective phases. When a piece-to-piece variation occurs among reactors, the inductance values La, Lb, Lc, and Ld in Equations (1) to (4) above do not match. This results in different values of the current ripples ΔIa, ΔIb, ΔIc, and ΔId even when the instantaneous values Vac_a, Vac_b, Vac_c, and Vac_d of the reactor voltages have the same value as one another. Accordingly, a difference also occurs among average values of respective reactor currents.

As for a difference in the voltage applied to the unit converters, use of a longer carrier period can reduce the effect of the applied voltage. In contrast, a piece-to-piece variation among reactors is unrelated to the carrier period. Thus, use of a longer carrier period does not reduce a difference among average values of respective reactor currents.

Figure 3:
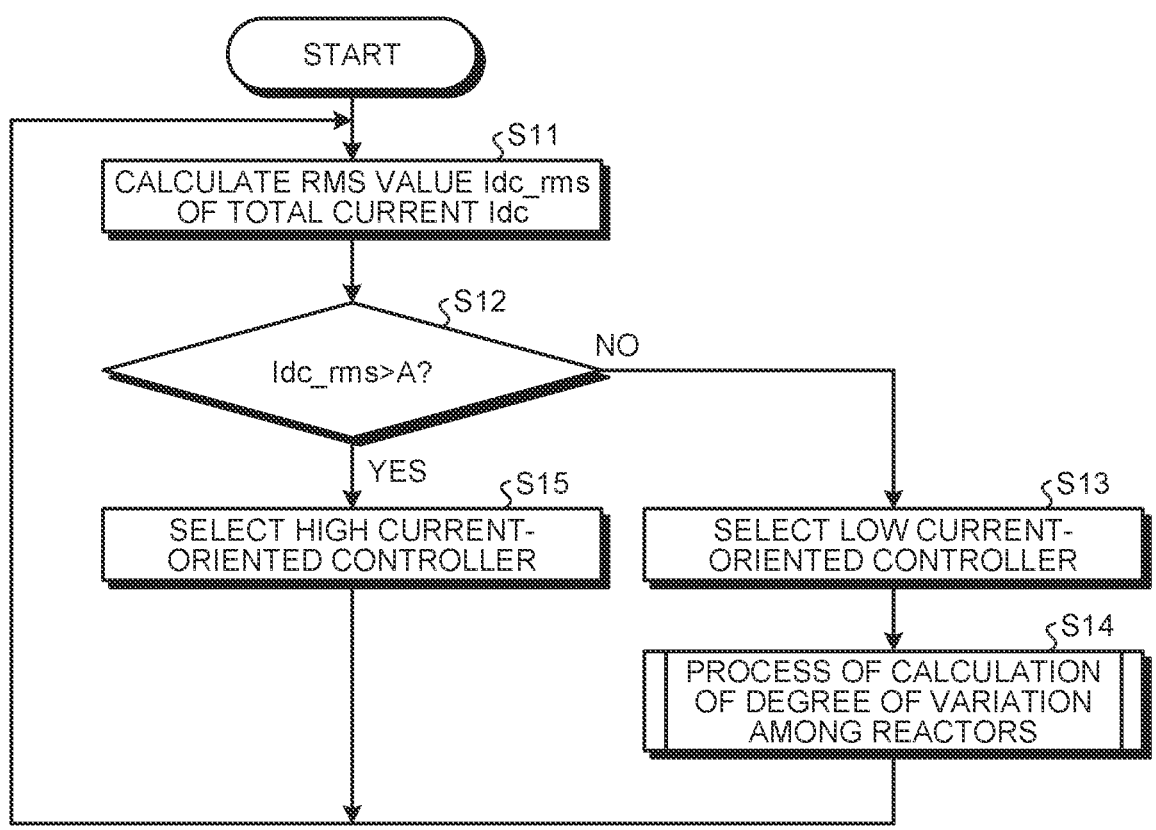
FIG. 3 is a flowchart for use in describing a control technique of the first embodiment.

A control technique for reducing a difference among average values of respective reactor currents due to a piece-to-piece variation among reactors will next be described. FIG. 3 is a flowchart for use in describing a control technique of the first embodiment. The operations of FIG. 3 are performed by the control device 200.

First, at step S11, a root mean square (RMS) value Idc_rms of the total current Idc is calculated on the basis of the detection value of the total current Idc. At next step S12, the RMS value Idc_rms is compared with a first threshold, which is threshold A. If the RMS value Idc_rms is less than or equal to threshold A (No at step S12), the process proceeds to step S13. Otherwise, if the RMS value Idc_rms is greater than threshold A (Yes at step S12), the process proceeds to step S15.

At step S13, a first controller, i.e., a low current-oriented controller, is selected. The phrase "low current-oriented controller is selected" means that the control device 200 activates the low current-oriented controller. The low current-oriented controller will be described in detail later. After completion of the operation at step S13, the process proceeds to step S14. At step S14, a process of calculation of degrees of variations among the reactors is performed. The process of step S14 will be described in detail later. After completion of the process of step S14, the process returns to step S11, and the process is repeated from step S11.

At step S15, a second controller, i.e., a high current-oriented controller, is selected. The phrase "high current-oriented controller is selected" means that the control device 200 activates the high current-oriented controller. The high current-oriented controller will be described in detail later. After completion of the operation at step S15, the process returns to step S11, and the process is repeated from step S11.

A supplementary explanation of the foregoing operation will next be given. The RMS value Idc_rms of the total current Idc is calculated at step S11, but the operation is not limited thereto. The average value of the total current Idc over one carrier period may be used instead of the RMS value Idc_rms.

In addition, although "No" is determined at step S12 described above when the RMS value Idc_rms of the total current Idc is equal to threshold A, "Yes" may instead be determined in such a case. That is, when the RMS value Idc_rms is equal to threshold A, either "Yes" or "No" may be determined.

Figure 4:
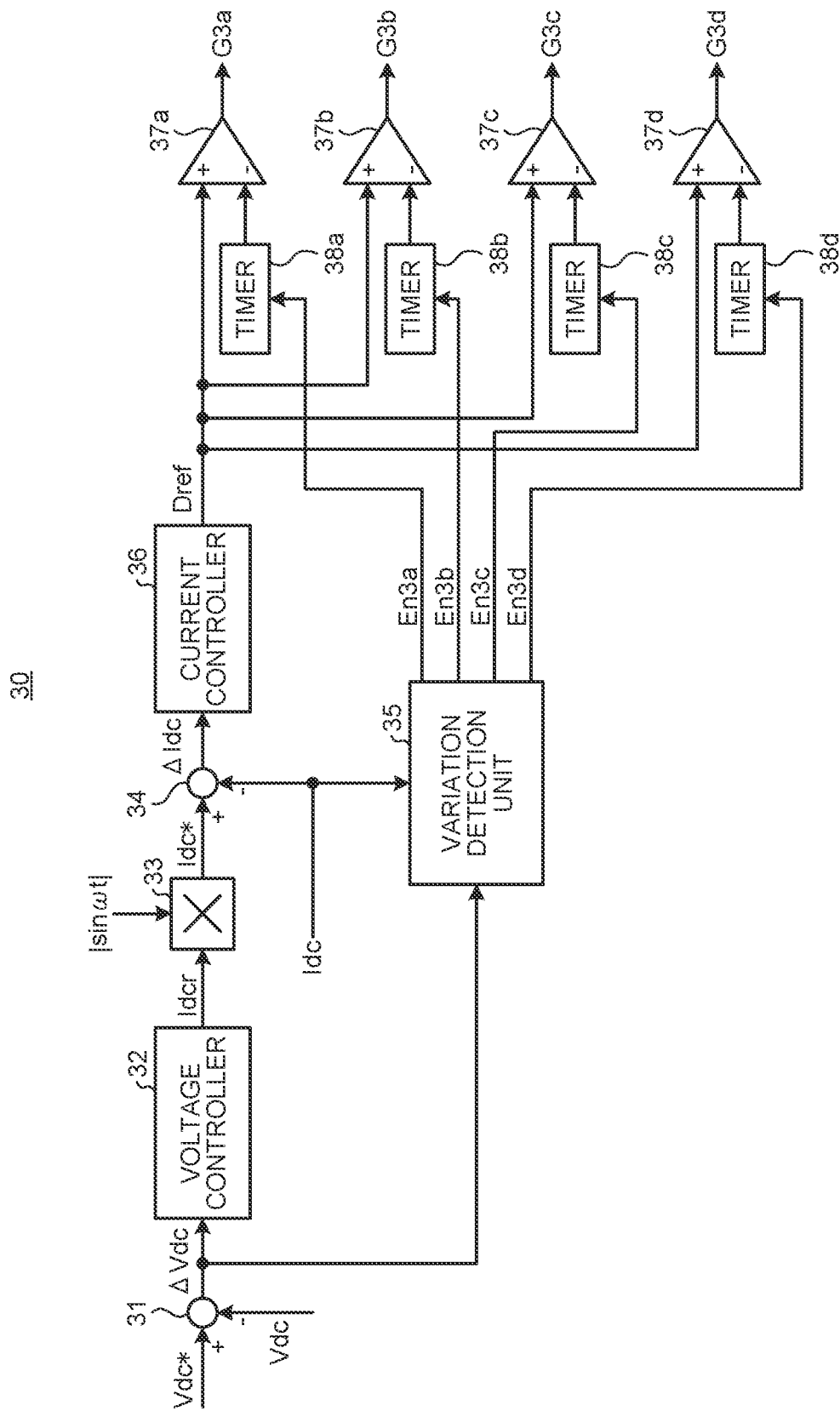
FIG. 4 is a block diagram illustrating an example configuration of a low current-oriented controller included in a control device of the first embodiment.

The low current-oriented controller described above will next be described. FIG. 4 is a block diagram illustrating an example configuration of a low current-oriented controller 30 included in the control device 200 of the first embodiment. The low current-oriented controller 30 illustrated in FIG. 4 is included in the control device 200.

The low current-oriented controller 30 includes, as illustrated in FIG. 4, subtractors 31 and 34, a voltage controller 32, a multiplier 33, a variation detection unit 35, a current controller 36, comparators 37a, 37b, 37c, and 37d, and timers 38a, 38b, 38c, and 38d. An example of each of the voltage controller 32 and the current controller 36 is a proportional integral (PI) controller. A case will be described below by way of example in which the voltage controller 32 and the current controller 36 are each a PI controller.

The subtractor 31 computes a deviation ΔVdc between a voltage command value Vdc* and the detection value of the capacitor voltage Vdc. The voltage command value Vdc* is a predetermined command value for the capacitor voltage Vdc. The voltage controller 32 provides PI control on the deviation ΔVdc to generate an amplitude command value Idcr for the total current Idc.

The multiplier 33 multiplies the amplitude command value Idcr for the total current Idc by an absolute value |sin ωt| of a sine wave signal having an angular frequency ω (=2πf), where f is the frequency of the AC voltage output by the AC power supply 1, i.e., the power supply frequency. The absolute value |sin ωt| of the sine wave signal is a signal synchronized with the phase of the AC voltage vac, and is generated on the basis of the detection value of the AC voltage vac.

The subtractor 34 computes a deviation ΔIdc between the output from the multiplier 33, i.e., a command value Idc* for the total current Idc, and the total current Idc. The current controller 36 provides PI control on the deviation ΔIdc to generate a duty command Dref. The duty command Dref generated is input to one terminal (terminal "+") of each of the comparators 37a, 37b, 37c, and 37d.

Another terminal (terminal "−") of the comparator 37a receives a signal output from the timer 38a. The comparator 37a compares the duty command Dref and the amplitude value of the signal output from the timer 38a, and outputs the result of comparison. The other comparators 37b, 37c, and 37d operate similarly, and description thereof will therefore be omitted herein to avoid duplicate description. As illustrated in FIG. 4, the output of the comparator 37a is the gate signal G3a to the switching element 3a; the output of the comparator 37b is the gate signal G3b to the switching element 3b; the output of the comparator 37c is the gate signal G3c to the switching element 3c; and the output of the comparator 37d is the gate signal G3d to the switching element 3d.

The variation detection unit 35 receives the total current Idc and the deviation ΔVdc. The variation detection unit 35 performs a process of calculation of the degrees of variations among the reactors 4a to 4d. This process corresponds to the process of step S14 described above. A "degree of variation" is an index representing the degree of variation among the reactors 4a to 4d, and is computed on the basis of the RMS value Idc_rms of the total current Idc. To perform the process of calculation of a "degree of variation", the variation detection unit 35 generates a control signal for individually enabling or disabling the output of each corresponding one of the timers, and outputs the control signal to the each corresponding one of the timers. This control signal is referred to as "timer output control signal". This timer output control signal controls the output timing of each corresponding one of the timers 38a to 38d. The timer output control signals input to the respective timers 38a, 38b, 38c, and 38d are respectively denoted by "En3a", "En3b", "En3c", and "En3d".

In FIG. 4, when the timer output control signal En3a is at a logic level representing "enable", the timer 38a is enabled, and the timer 38a then outputs a predetermined signal. This causes the comparator 37a to output the predetermined gate signal G3a. Alternatively, when the timer output control signal En3a is at a logic level representing "disable", the timer 38a is disabled. In the example configuration of FIG. 4, the timer 38a outputs a signal at "logic one". This stops outputting of the gate signal G3a. The other comparators 37b to 37d and the other timers 38b to 38d operate similarly, and description thereof will therefore be omitted herein to avoid duplicate description.

Figure 5:
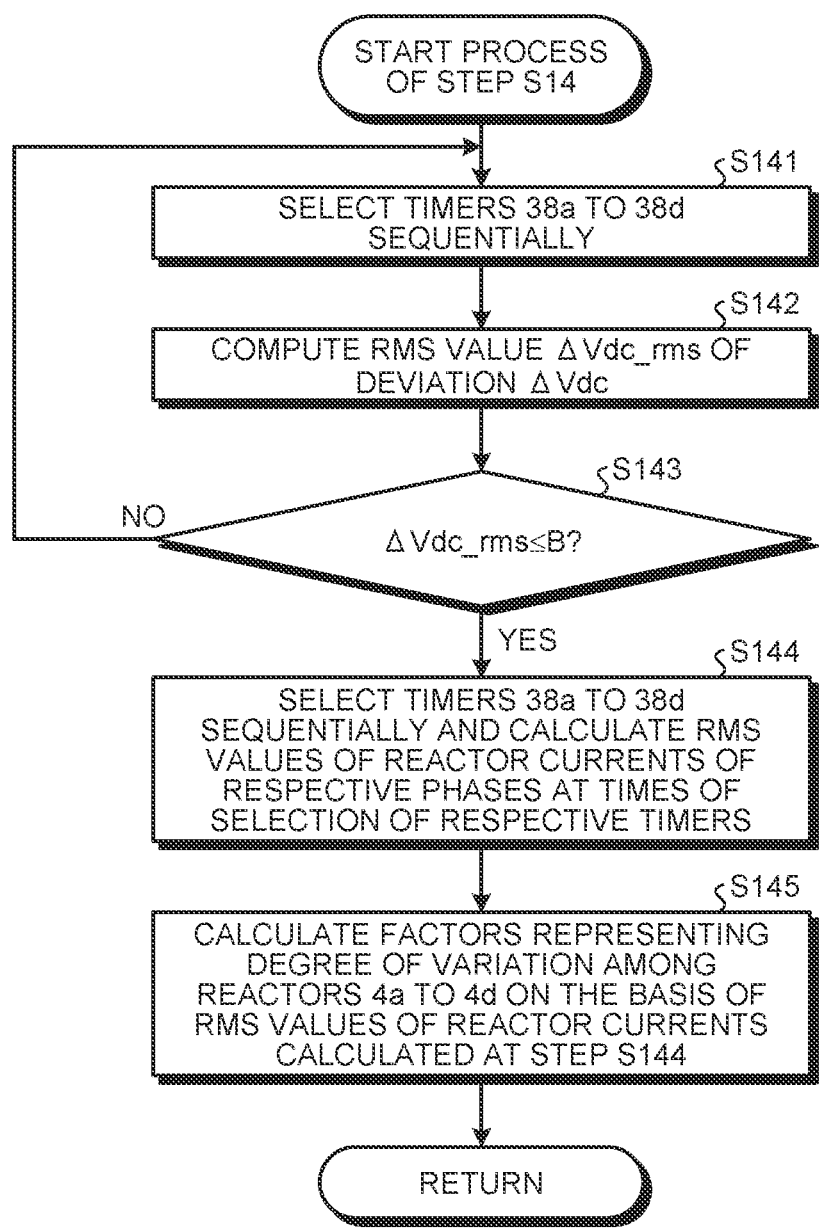
FIG. 5 is a flowchart for use in describing the process of step S14 illustrated in FIG. 3.

FIG. 5 is a flowchart for use in describing the process of step S14 illustrated in FIG. 3. The operations of FIG. 5 are performed by the control device 200.

First, at step S141, the timers 38a to 38d are sequentially selected. This causes the predetermined gate signals G3a to G3d described above to be generated, the smoothing capacitor 6 to be charged, and the capacitor voltage Vdc to be increased. At step S142, the RMS value ΔVdc_rms of the deviation ΔVdc is computed. At step S143, the RMS value ΔVdc_rms is compared with a second threshold, which is threshold B. If the RMS value ΔVdc_rms is less than or equal to threshold B (Yes at step S143), the process proceeds to step S144. Otherwise, if the RMS value ΔVdc_rms is greater than threshold B (No at step S143), the process returns to step S141, and the process is repeated from step S141. As described above, in the process of steps S141 to S143, control of charging the smoothing capacitor 6 is continued until the RMS value ΔVdc_rms reaches or falls below threshold B.

At step S144, the timers 38a to 38d are sequentially selected, and the RMS values of the reactor currents of the respective phases at the times of selection of the respective timers are calculated. Note that the operation of step S144 is performed to control the operations of the unit converters 100a to 100d to allow a current corresponding to a single phase to flow through the current detector 73. This control allows the current detector 73 to detect the RMS value of a current flowing through each of the reactors 4a to 4d, i.e., the RMS value of a reactor current flowing through only the selected single reactor.

At step S145, factors representing the respective degrees of variations among the reactors 4a to 4d are calculated on the basis of the RMS values of the reactor currents calculated at step S144. Each of the factors representing the respective degrees of variations is referred to herein as "variation factor". The specific formulae for calculating the variation factors can be expressed by Equations (5) to (7) below.

$$k1 = Ia\_rms / Ib\_rms \quad (5)$$

$$k2 = Ia\_rms / Ic\_rms \quad (6)$$

$$k3 = Ia\_rms / Id\_rms \quad (7)$$

In Equations (5) to (7) above, Ia_rms, Ib_rms, Ic_rms, and Id_rms are the RMS values of the respective reactor currents. Variation factors k1, k2, and k3 are used in the high current-oriented controller.

After completion of the operation at step S145, the process returns to the flowchart of FIG. 3, from which the process has been called. As illustrated in FIG. 3, if the RMS value Idc_rms of the total current Idc is less than or equal to threshold A, the process of step S14 is called, and the foregoing computation process is preformed repeatedly.

A supplementary explanation of the foregoing operation will next be given. At steps S141 and S144, the timers 38a to 38d are sequentially selected to generate the predetermined gate signals G3a to G3d, but the operation is not limited thereto. The timers 38a to 38d may be selected in any order.

In addition, although four gate signals are generated at step S141 to operate the four unit converters, only one of the unit converters may be caused to operate using a single gate signal rather than generating multiple gate signals. Note that it is obviously preferable, in this case, to switch the unit converter to be operated each time the operation of step S141 is performed to prevent a temperature increase in one or a specific reactor.

Moreover, although the RMS value ΔVdc_rms of the deviation ΔVdc is calculated at step S142, the operation is not limited thereto. The average value of the deviation ΔVdc over one carrier period may be used instead of the RMS value ΔVdc_rms.

Furthermore, although "Yes" is determined at step S143 described above when the RMS value ΔVdc_rms is equal to threshold B, "No" may instead be determined in such a case. That is, when the RMS value ΔVdc_rms is equal to threshold B, either "Yes" or "No" may be determined.

Still furthermore, Equations (5) to (7) above are formulae for performing the calculations based on the RMS value Ia_rms of the phase-a reactor current. That is, the foregoing operation of step S145 obtains the variation factors k1, k2, and k3 using phase a as the reference phase, but the operation is not limited thereto. The reference phase may be any one phase of phases a to d.

Figure 6:
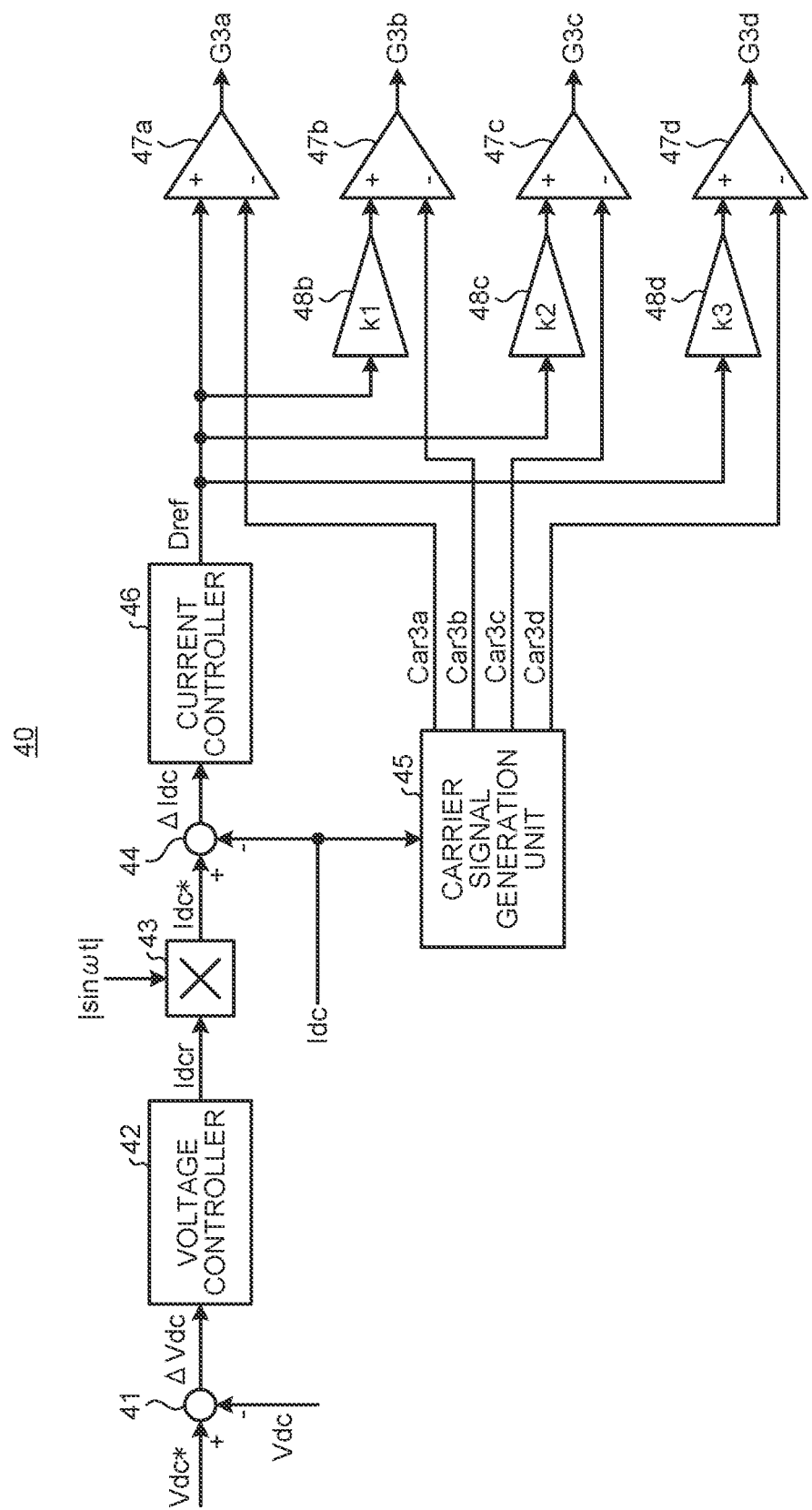
FIG. 6 is a block diagram illustrating an example configuration of a high current-oriented controller included in the control device of the first embodiment.
Figure 7:
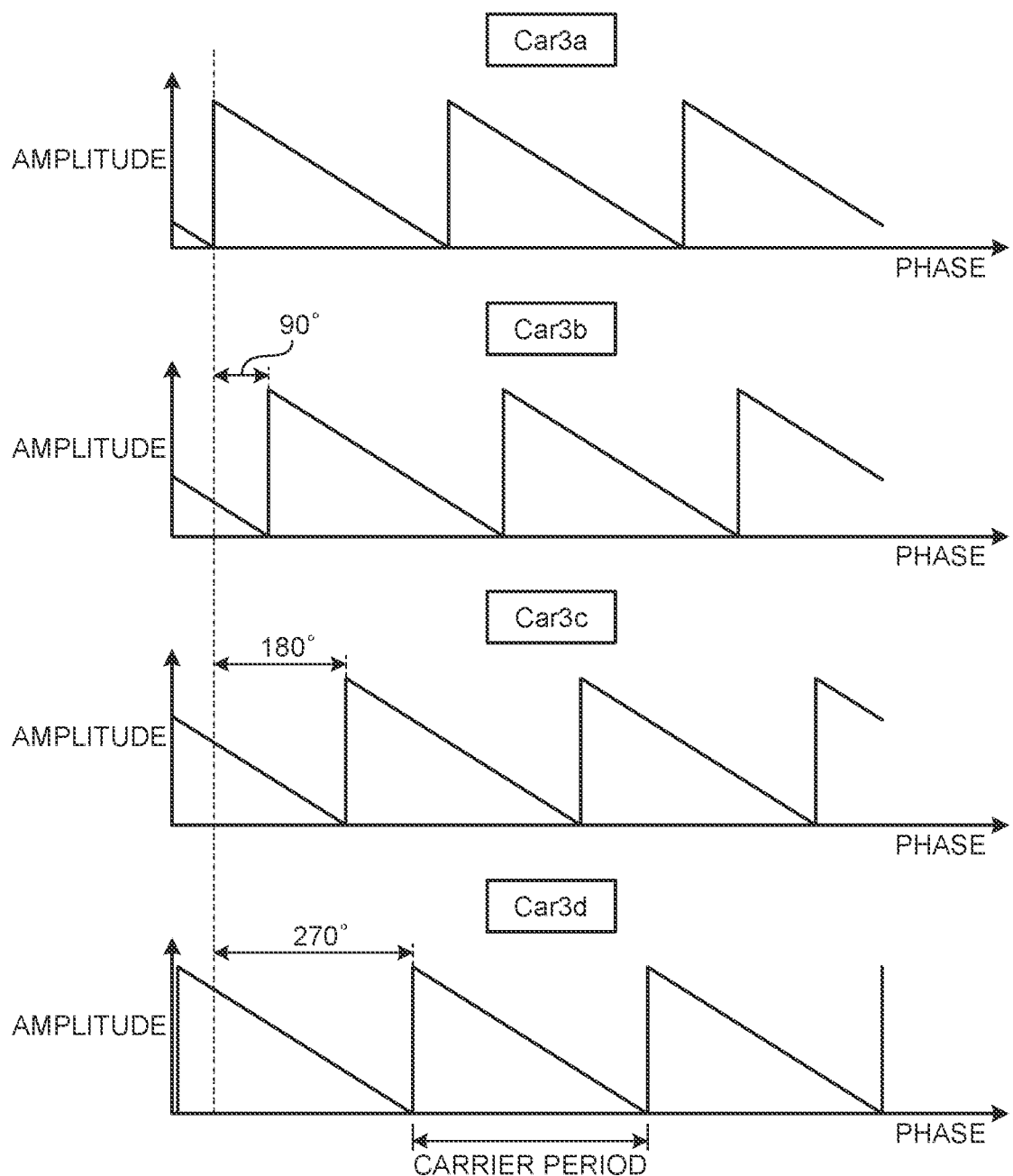
FIG. 7 is a diagram illustrating example waveforms of carrier signals generated in the high current-oriented controller illustrated in FIG. 6.

The high current-oriented controller will next be described. FIG. 6 is a block diagram illustrating an example configuration of a high current-oriented controller 40 included in the control device 200 of the first embodiment. The high current-oriented controller 40 illustrated in FIG. 6 is included in the control device 200. FIG. 7 is a diagram illustrating example waveforms of carrier signals generated in the high current-oriented controller 40 illustrated in FIG. 6.

The high current-oriented controller 40 includes, as illustrated in FIG. 6, subtractors 41 and 44, a voltage controller 42, a multiplier 43, a carrier signal generation unit 45, a current controller 46, comparators 47a, 47b, 47c, and 47d, and amplifiers 48b, 48c, and 48d. An example of each of the voltage controller 42 and the current controller 46 is a PI controller. A case will be described below by way of example in which the voltage controller 42 and the current controller 46 are each a PI controller.

The subtractor 41 computes the deviation ΔVdc between the voltage command value Vdc* and the detection value of the capacitor voltage Vdc. The voltage controller 42 provides PI control on the deviation ΔVdc to generate the amplitude command value Idcr for the total current Idc.

The multiplier 43 multiplies the amplitude command value Idcr for the total current Idc by the absolute value |sin ωt| of the sine wave signal having the angular frequency ω (=2πf). Similarly to the case of the low current-oriented controller 30, f represents the power supply frequency, and the absolute value |sin ωt| of the sine wave signal is a signal synchronized with the phase of the AC voltage vac.

The subtractor 44 computes the deviation ΔIdc between the output from the multiplier 43, i.e., the command value Idc* for the total current Idc, and the total current Idc. The current controller 46 provides PI control on the deviation ΔIdc to generate the duty command Dref.

The carrier signal generation unit 45 receives the total current Idc. The carrier signal generation unit 45 generates carrier signals Car3a, Car3b, Car3c, and Car3d on the basis of the total current Idc.

FIG. 7 illustrates an example of the carrier signals in four-phase interleaving. In four-phase interleaving, the phase difference between carrier signals is 90°. Accordingly, when phase a is the reference phase, the carrier signal Car3b of phase b has a phase difference of 900 relative to the carrier signal Car3a of phase a. In addition, the carrier signal Car3c of phase c has a phase difference of 1800 relative to the carrier signal Car3a of phase a. Moreover, the carrier signal Car3d of phase d has a phase difference of 2700 relative to the carrier signal Car3a of phase a.

Note that FIG. 7 illustrates the carrier signals each as an inverted sawtooth wave by way of example, but the waveforms are not limited thereto. The carrier signals may each be a triangular wave or a sawtooth wave.

Returning to the description with reference to FIG. 6, the terminal "+" of the comparator 47a receives the duty command Dref, and the terminal "−" of the comparator 47a receives the carrier signal Car3a. The comparator 47a compares the duty command Dref and the amplitude value of the carrier signal Car3a, and outputs the result of comparison. As illustrated FIG. 6, the output of the comparator 47a is the gate signal G3a to the switching element 3a.

In addition, the terminal "+" of the comparator 47b receives the output of the amplifier 48b, and the terminal "−" of the comparator 47b receives the carrier signal Car3b. The amplifier 48b is assigned the variation factor k1 given in Equation (5) above as the gain thereof. That is, the control parameter to be used in the high current-oriented controller 40 is set using the computation result obtained when the low current-oriented controller 30 was caused to operate. Thus, the terminal "+" of the comparator 47b receives a signal having a value resulting from multiplication of the duty command Dref by k1. In addition, the comparator 47b outputs a gate signal G3b that has been adjusted according to the degree of variation of the reactor 4b.

The other comparators 47c and 47d operate similarly. The amplifier 48c is assigned the variation factor k2 as the gain thereof. The terminal "+" of the comparator 47c receives the output of the amplifier 48c, and the terminal "−" of the comparator 47c receives the carrier signal Car3c. The comparator 47c outputs a gate signal G3c that has been adjusted according to the degree of variation of the reactor 4c. In addition, the amplifier 48d is assigned the variation factor k3 as the gain thereof. The terminal "+" of the comparator 47d receives the output of the amplifier 48d, and the terminal "−" of the comparator 47d receives the carrier signal Car3d. The comparator 47d outputs a gate signal G3d that has been adjusted according to the degree of variation of the reactor 4d.

Note that although FIG. 6 illustrates the gains given to the respective amplifiers 48b, 48c, and 48d as k1, k2, and k3, this does not intend to exclude a case in which these amplifiers are assigned adjustment gains that reflect respective characteristics of the amplifiers.

Figure 8:
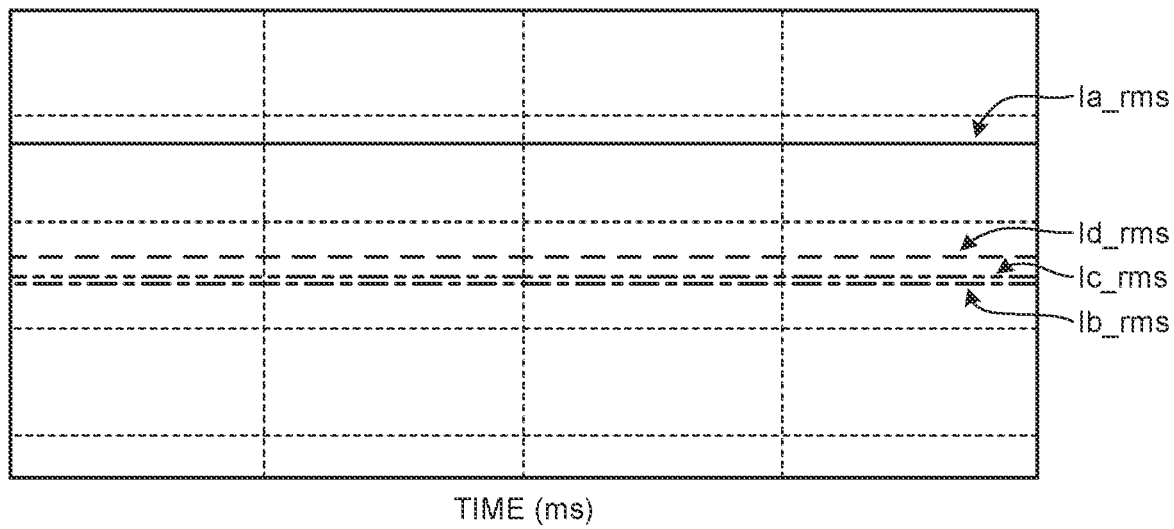
FIG. 8 is a diagram for use in describing an advantage of the power conversion apparatus according to the first embodiment.
Figure 9:
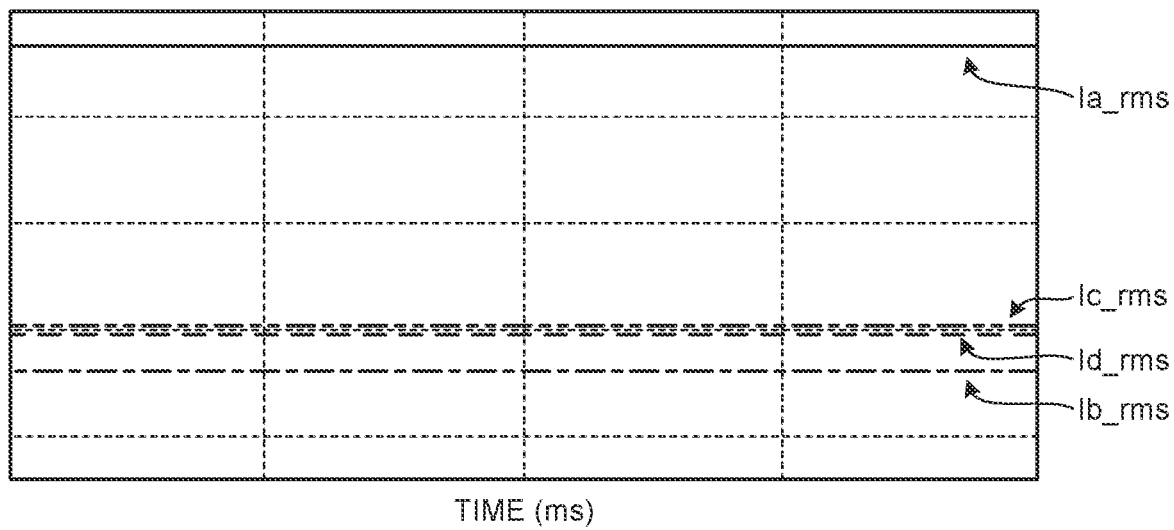
FIG. 9 is a comparative diagram for use in describing the advantage of the power conversion apparatus according to the first embodiment.

FIG. 8 is a diagram for use in describing an advantage of the power conversion apparatus 120 according to the first embodiment. FIG. 9 is a comparative diagram for use in describing the advantage of the power conversion apparatus 120 according to the first embodiment. The diagrams illustrated in FIGS. 8 and 9 each illustrate a result of numerical simulation. Specifically, FIG. 8 illustrates a simulation result when the high current-oriented controller 40 illustrated in FIG. 6 has performed gain adjustment using the amplifiers 48b, 48c, and 48d. Meanwhile, FIG. 9 illustrates a simulation result when the high current-oriented controller 40 illustrated in FIG. 6 has performed no gain adjustment using the amplifiers 48b, 48c, and 48d. In FIGS. 8 and 9, the solid line represents the RMS value of the phase-a reactor current, the dashed-and-dotted line represents the RMS value of the phase-b reactor current, the dashed-double-dotted line represents the RMS value of the phase-c reactor current, and the broken line represents the RMS value of the phase-d reactor current. Note that the simulations were performed under a condition that the inductance values La, Lb, Lc, and Ld have a relationship of La<Lb=Lc=Ld.

As described above, the reactor 4a in the unit converter 100a has an inductance value less than the inductance values of the reactors 4b, 4c, and 4d in the other three unit converters 100b, 100c, and 100d. When no gain adjustment is performed, this causes the RMS value of the phase-a reactor current to be greater than the RMS values of the phase-b, phase-c, and phase-d reactor currents as illustrated in FIG. 9. In contrast, as can be seen by comparison between FIG. 8 and FIG. 9, performing the gain adjustment in the first embodiment reduces the RMS value of the phase-a reactor current, and increases the RMS values of the phase-b, phase-c, and phase-d reactor currents. That is, FIGS. 8 and 9 indicate that the gain adjustment in the first embodiment equalizes, or reduces the difference between, the reactor currents among the multiple unit converters.

As described above, the power conversion apparatus according to the first embodiment includes a low current-oriented controller and a high current-oriented controller. When the detection value detected by the current detector is less than or equal to a first threshold, the first controller is activated, while when the detection value detected by the current detector is greater than the first threshold, the second controller is activated. The low current-oriented controller causes the unit converters to operate to cause a current corresponding to a single phase to flow through the current detector. The high current-oriented controller controls the operation of each of the unit converters on the basis of a result of comparison between a duty command and a carrier signal, where the duty command is generated on the basis of the detection values detected by the current detector and by the voltage detector. A control parameter to be used in the second controller is set using a computation result obtained when the first controller was caused to operate. The control parameter includes a degree of variation among reactors. This enables the reactor currents to be equalized even when a piece-to-piece variation has occurred among reactors for respective phases. Equalization of the reactor currents can in turn avoid a situation where a specific reactor heats to a high temperature. This can avoid an increase in size of the reactors.

In addition, the power conversion apparatus according to the first embodiment is capable of providing the control described above on the basis of the total current, which is the sum of the reactor currents of the respective phases, without detecting individual reactor currents of the respective phases. This enables a configuration having one current detector to be used, and can thus prevent an increase in the number of current detectors even when the number of interleaved phases increases.

Second Embodiment

Figure 10:
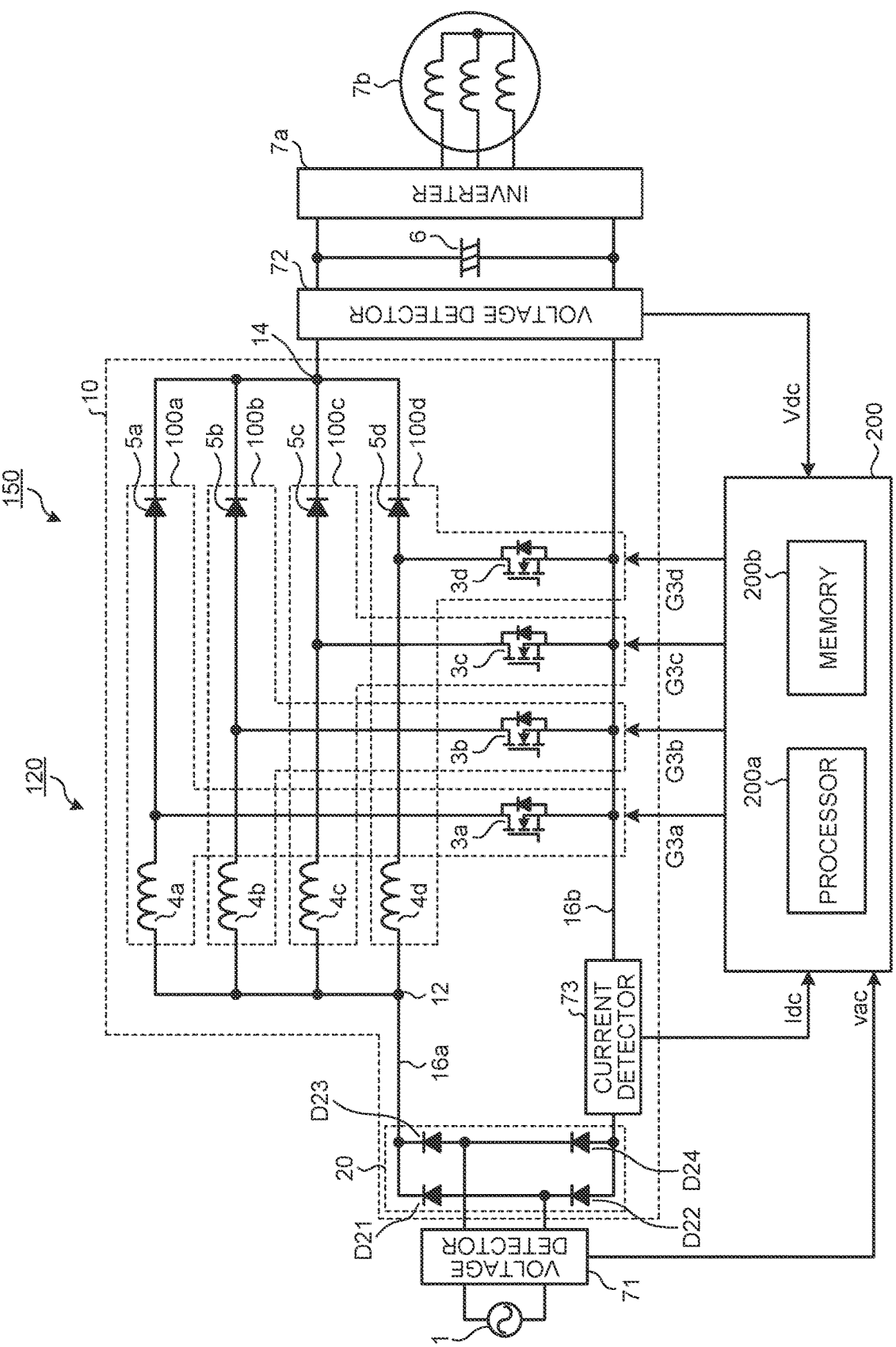
FIG. 10 is a diagram illustrating an example configuration of a motor drive apparatus according to a second embodiment.

The description of a second embodiment will deal with an example application of the power conversion apparatus 120 described in the first embodiment, to a motor drive apparatus. FIG. 10 is a diagram illustrating an example configuration of a motor drive apparatus 150 according to the second embodiment. The motor drive apparatus 150 according to the second embodiment illustrated in FIG. 10 includes an inverter 7a and a motor 7b in addition to the elements of the power conversion apparatus 120 illustrated in FIG. 1.

The output of the inverter 7a is connected to the motor 7b. The motor 7b is an example of a load device. The inverter 7a converts DC power stored in the smoothing capacitor 6 into AC power, and supplies the AC power obtained by the conversion to the motor 7b for driving of the motor 7b. The motor drive apparatus 150 illustrated in FIG. 10 is applicable to products such as a blower, a compressor, and an air conditioner.

Figure 11:
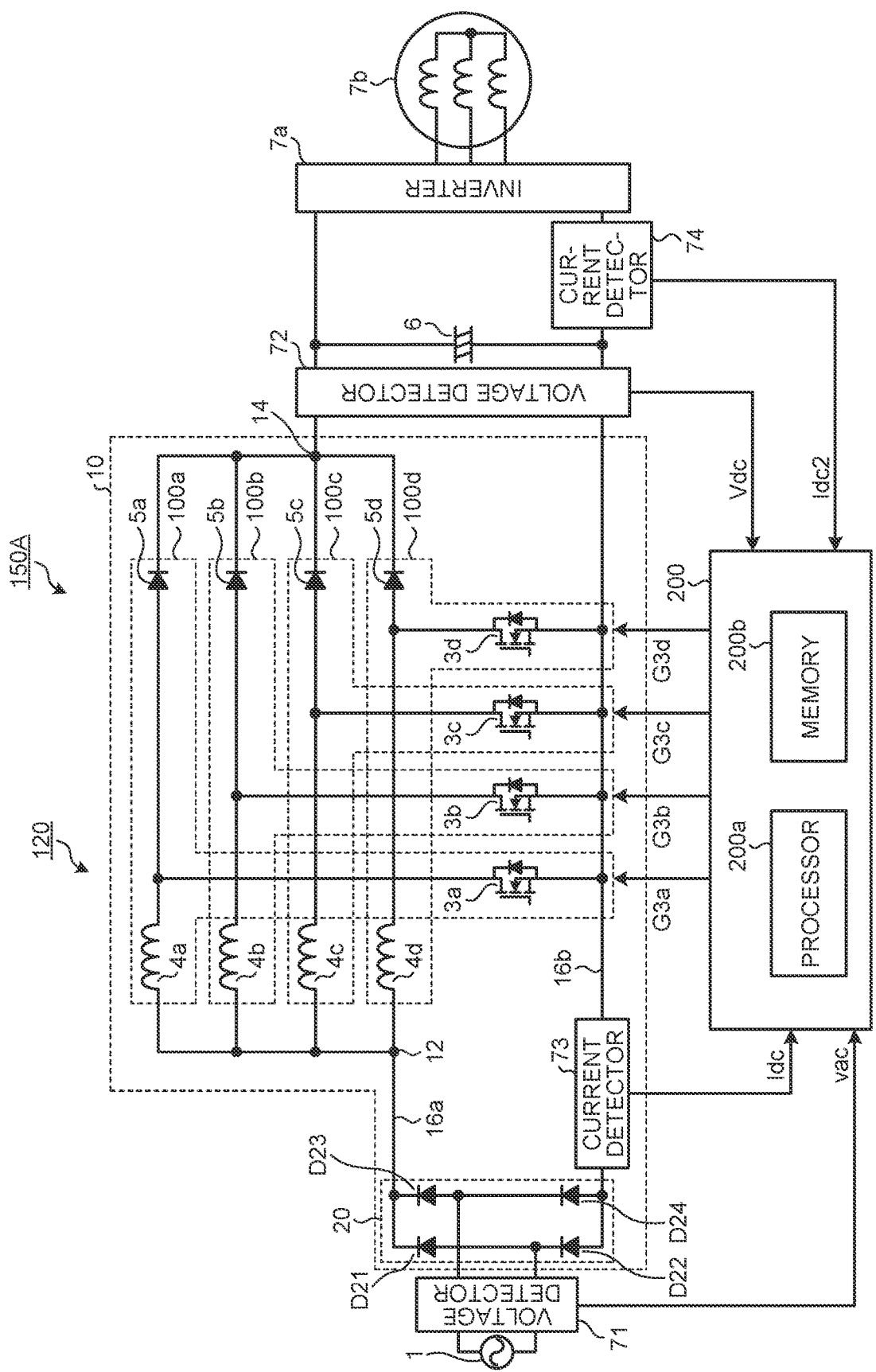
FIG. 11 is a diagram illustrating an example configuration of a motor drive apparatus according to a variation of the second embodiment.

FIG. 11 is a diagram illustrating an example configuration of a motor drive apparatus 150A according to a variation of the second embodiment. The motor drive apparatus 150A illustrated in FIG. 11 differs in configuration from the motor drive apparatus 150 illustrated in FIG. 10 in additionally including a current detector 74 between the smoothing capacitor 6 and the inverter 7a. The current detector 74 detects a direct current (DC) current Idc2 flowing between the converter circuit 10 and the inverter 7a. The detection value of the DC current Idc2 detected by the current detector 74 is input to the control device 200.

When the configuration includes the current detector 74 as does the motor drive apparatus 150A according to the variation of the second embodiment, the low current-oriented controller 30 and the high current-oriented controller 40 may be switched from one to the other on the basis of the detection value detected by the current detector 74. The control is specifically performed as follows. Note that the current detector 74 may be referred to as "second current detector".

The control device 200 computes an RMS value Idc2_rms of the DC current Idc2 on the basis of the detection value of the DC current Idc2. The control device 200 compares the RMS value Idc2_rms with a third threshold, which is threshold C. If the RMS value Idc2_rms is less than or equal to threshold C, the control device 200 activates the low current-oriented controller 30. Alternatively, if the RMS value Idc2_rms is greater than threshold C, the control device 200 activates the high current-oriented controller 40. The total current Idc flowing through the current detector 73 has a correlation with the DC current Idc2 flowing through the current detector 74. Thus, switching between the low current-oriented controller 30 and the high current-oriented controller 40 may be controlled on the basis of the detection value of the DC current Idc2. Such control also provides an advantage similar to the advantage of the first embodiment.

Note that, instead of performing the foregoing control, control may be performed such that the low current-oriented controller 30 is activated when the RMS value Idc2_rms of the DC current Idc2 is less than threshold C, while the high current-oriented controller 40 is activated when the RMS value Idc2_rms of the DC current Idc2 is greater than or equal to threshold C.

Figure 12:
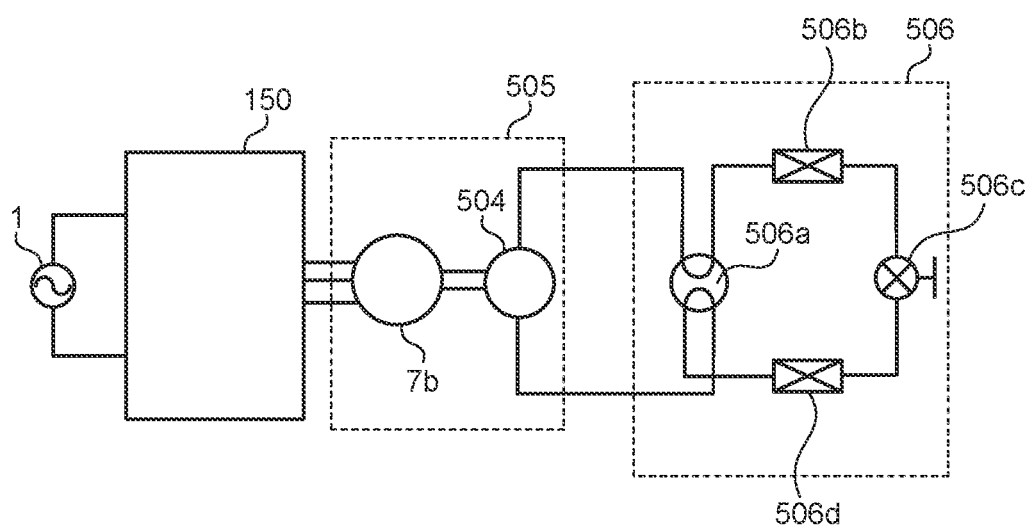
FIG. 12 is a diagram illustrating an example of use of the motor drive apparatus illustrated in FIG. 10 in an air conditioner.

FIG. 12 is a diagram illustrating an example of use of the motor drive apparatus 150 illustrated in FIG. 10 in an air conditioner. The output of the motor drive apparatus 150 is connected to the motor 7b, and the motor 7b is coupled to a compression element 504. The motor 7b and the compression element 504 are included in a compressor 505. A refrigeration cycle unit 506 is configured to include a four-way valve 506a, an indoor heat exchanger 506b, an expansion valve 506c, and an outdoor heat exchanger 506d.

The flow channel of a refrigerant that circulates in the air conditioner is configured to start from the compression element 504, pass through the four-way valve 506a, the indoor heat exchanger 506b, the expansion valve 506c, and the outdoor heat exchanger 506d, and again through the four-way valve 506a, and then return to the compression element 504. The motor drive apparatus 150 is supplied with electric power from the AC power supply 1, and rotates the motor 7b. The rotation of the motor 7b causes the compression element 504 to compress the refrigerant and thus to allow the refrigerant to circulate in the refrigeration cycle unit 506.

The motor drive apparatus 150 or 150A according to the second embodiment is configured to include the power conversion apparatuses 120 according to the first embodiment. This enables products such as a blower, a compressor, and an air conditioner including the motor drive apparatus 150 or 150A according to the second embodiment to provide advantages described in the first embodiment.

Note that the configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1 AC power supply; 3a, 3b, 3c, 3d switching element; 4a, 4b, 4c, 4d reactor; 5a, 5b, 5c, 5d backflow-preventing diode; 6 smoothing capacitor; 7a inverter; 7b motor; 10 converter circuit; 20 rectification circuit; 30 low current-oriented controller; 31, 34, 41, 44 subtractor; 32, 42 voltage controller; 33, 43 multiplier; 35 variation detection unit; 36, 46 current controller; 37a, 37b, 37c, 37d, 47a, 47b, 47c, 47d comparator; 38a, 38b, 38c, 38d timer; 40 high current-oriented controller; 45 carrier signal generation unit; 48b, 48c, 48d amplifier; 71, 72 voltage detector; 73, 74 current detector; 100a, 100b, 100c, 100d unit converter; 120 power conversion apparatus; 150, 150A motor drive apparatus; 200 control device; 200a processor; 200b memory; 504 compression element; 505 compressor; 506 refrigeration cycle unit; 506a four-way valve; 506b indoor heat exchanger; 506c expansion valve; 506d outdoor heat exchanger.

The invention claimed is:

1. A power conversion apparatus comprising:
a converter circuit comprising unit converters, the converter circuit converting an alternating current voltage output from an alternating current power supply into a direct current voltage, the unit converters each comprising a reactor and at least one switching element;
a current detector detecting a sum of currents flowing through the reactors;
a voltage detector detecting an output voltage of the converter circuit;
a first controller causing the unit converters to operate sequentially to enable the current detector to detect a current corresponding to a single unit converter of the unit converters; and
a second controller controlling an operation of the unit converters on a basis of a result of comparison between a duty command and a carrier signal, the duty command being generated on a basis of detection values detected by the current detector and by the voltage detector, wherein when the detection value detected by the current detector is less than or equal to a first threshold, the first controller is activated, and when the detection value detected by the current detector is greater than the first threshold, the second controller is activated.

2. The power conversion apparatus according to claim 1, wherein a control parameter to be used in the second controller is a control parameter calculated and obtained when the first controller is caused to operate.

3. The power conversion apparatus according to claim 2, wherein the control parameter is a variation factor being a degree of variation among the reactors.

4. The power conversion apparatus according to claim 3, wherein the first controller calculates the variation factor on a basis of a root mean square value of a current flowing through each of the reactors.

5. The power conversion apparatus according to claim 3, wherein the first controller compares a root mean square value of a deviation between a voltage command value and the detection value detected by the voltage detector with a second threshold, and when the deviation is less than or equal to the second threshold, the first controller performs a process of calculation of the variation factor.

6. The power conversion apparatus according to claim 4, wherein the first controller comprises timers for respective unit converters, an output of the timers is controlled using a timer output control signal, the timer output control signal is a control signal that enables or disables the output of each of the timers, and the first controller controls output timing of the timers using the timer output control signal upon calculation of the variation factor.

7. The power conversion apparatus according to claim 3, wherein the second controller generates a gate signal for controlling the switching element on a basis of a duty command and of the variation factor, the duty command being generated on a basis of the detection values detected by the current detector and by the voltage detector.

8. The power conversion apparatus according to claim 1, wherein the switching elements used in the unit converters are formed of a wide bandgap semiconductor.

9. The power conversion apparatus according to claim 8, wherein the wide bandgap semiconductor is silicon carbide, gallium nitride, gallium oxide, or diamond.

10. A motor drive apparatus comprising:

the power conversion apparatus according to claim 1; and an inverter converting direct-current power output from the power conversion apparatus into alternating-current power and supplying the alternating-current power obtained by the conversion to a motor to drive the motor.

11. The motor drive apparatus according to claim 10, comprising:

a second current detector detecting a direct current flowing between the converter circuit and the inverter, wherein switching between the first controller and the second controller is controlled using a detection value detected by the second current detector.

12. A compressor comprising:

the motor drive apparatus according to claim 10;

the motor driven by the motor drive apparatus; and a compression element connected to the motor, the compression element being caused to perform a refrigerant compression operation as the motor is driven by the motor drive apparatus.

13. The power conversion apparatus according to claim 5, wherein the first controller comprises timers for respective unit converters, an output of the timers is controlled using a timer output control signal, the timer output control signal is a control signal that enables or disables the output of each of the timers, and the first controller controls output timing of the timers using the timer output control signal upon calculation of the variation factor.

14. An air conditioner comprising:

the compressor according to claim 12; and a refrigeration cycle unit through which refrigerant circulates as the compression element of the compressor is caused to perform the refrigerant compression operation.

* * * * *